No. 620,973. Patented Mar. 14, 1899.
L. RÜHL.
DEVICE FOR ADMIXING CARBONIC ACID TO OUTFLOWING WATER.
(Application filed Feb. 16, 1898.)
(No Model.)
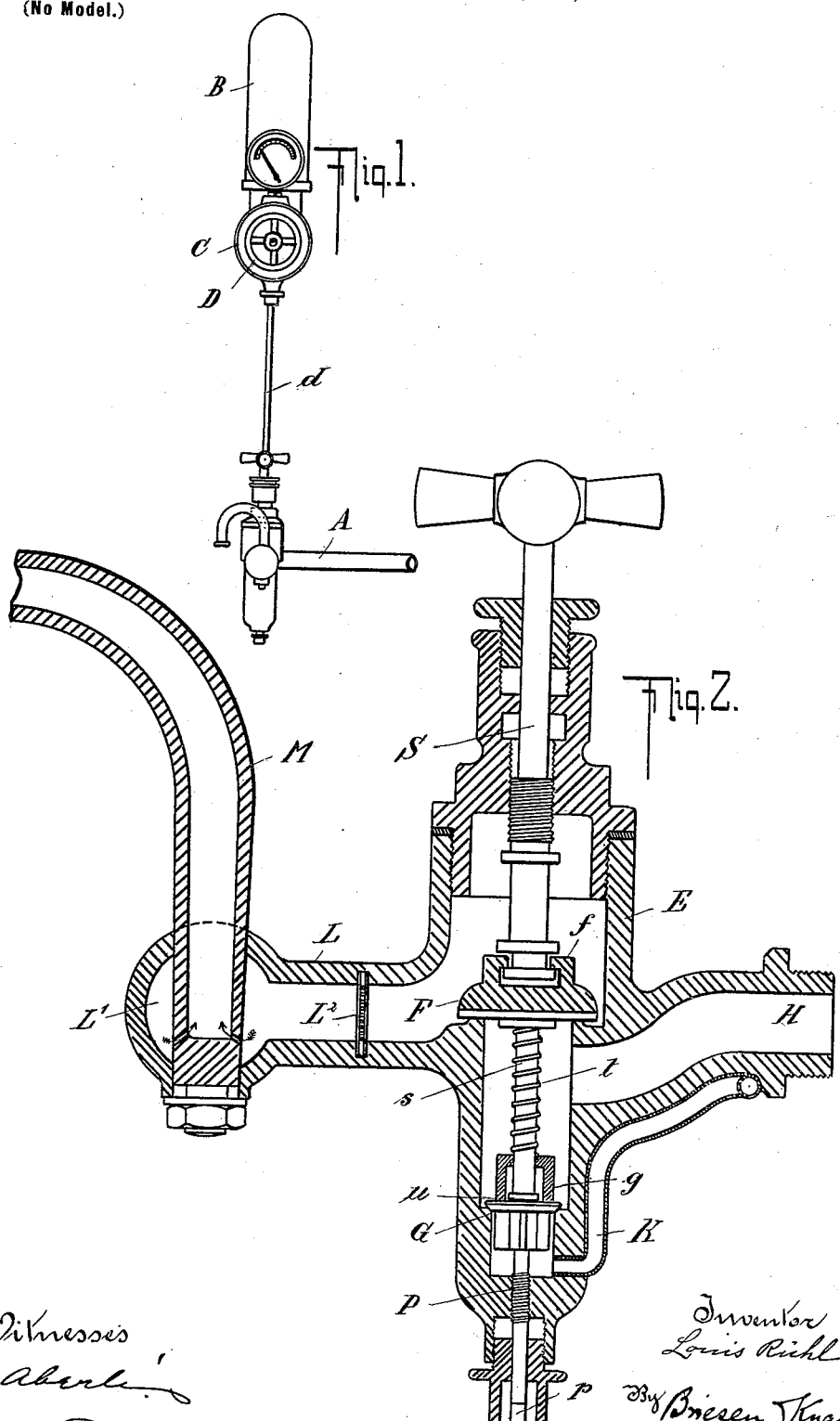

UNITED STATES PATENT OFFICE.

LOUIS RÜHL, OF WORMS, GERMANY.

DEVICE FOR ADMIXING CARBONIC ACID TO OUTFLOWING WATER.

SPECIFICATION forming part of Letters Patent No. 620,973, dated March 14, 1899.

Application filed February 16, 1898. Serial No. 670,478. (No model.)

*To all whom it may concern:*

Be it known that I, LOUIS RÜHL, manager of brewery, residing at Worms-on-the-Rhine, Rheinhessen, German Empire, have invented new and useful Improvements in Apparatus for Admixing Carbonic Acid to Outflowing Water, of which the following is a specification.

My invention has reference to an apparatus for supplying carbonic acid to a water-conduit in such a manner that if the cock is opened and water discharged a portion of carbonic acid is thoroughly mixed with the same.

I propose to take the carbonic acid from a reservoir or vessel in which it is contained in a fluid state. I introduce this carbonic acid after having passed it through a pressure-reducing valve to reduce its pressure into the water-conduit at a place situated between the outlet-cock and the main pipe, and in order to prevent the escape of the carbonic acid in the direction of the main pipe and the entrance of water into the pipe containing carbonic acid I provide a gas-valve which is operated so as not to open before the opening of the water-cock and to close before the closing of the same.

In order to better explain my invention, I will refer to the accompanying drawings, in which—

Figure 1 is an elevation of my new apparatus, and Fig. 2 is an enlarged section of the cock.

In the drawings, A is the water-conduit;
B, the carbonic-acid vessel; C, the reduction-valve; D, the hand-wheel to the exit-valve of the carbonic acid. The carbonic acid flows through the pipe $d$ to the pipe K and enters the lower part of the case of the water cock or valve F in the body, which is raised and lowered by means of a screw-threaded stem and a collar $f$. The water enters at H, passes the valve F when it is raised, goes through a sieve $L^2$, and escapes by a bent pipe M, which is inserted into the enlarged front $L'$ of the pipe L.

The stem $s$ of the gas-valve G is rigidly fixed to the valve F and is provided with a flange $u$ at its lower end, which engages a brace $g$, which is rigidly fixed to the valve G.

A coiled spring $t$ presses the valve G downward. A screw-threaded stem P, with a quadrangular end $p$, may be used to screw the valve G down when out of use. It will be observed that the two valves are thus operated by a common valve-operating means, which is effective to open the liquid-valve before the gas-valve is opened and to close the gas-valve before the liquid-valve is closed.

The operation of the device is as follows: If the valve F is lifted, the flow of water begins. When the valve F has been lifted a certain distance, the flange $u$ of the stem $s$ will lift the valve G also. The current of water having reached by this time a rather great velocity, the carbonic acid will be prevented from entering the admission-pipe and will be carried along by and mixed with the water in the valve-case. The sieve $L^2$ will cause a thorough mixing, which cannot be arrived at if the carbonic acid enters the pipe near its nozzle by a small opening in the direction of the axis of the pipe. The water and the carbonic acid enter the pipe M by small holes, following the course of the arrows, the intermingling of gas and water being accelerated thereby and also by the upward direction of the current. If the valve F is closed, the valve G closes first, as will be understood, as the flange $u$ has a slight play in the brace $g$.

Now what I claim, and desire to secure by Letters Patent, is—

1. The combination of a water-valve with a gas-valve at the bottom of the valve-case, a water-pipe opening into the valve-case between the said two valves and a pipe connected with a reservoir of carbonic acid opening into the bottom of the valve-case, substantially as described.

2. In a carbonating valve structure, the combination of a water-valve provided with a projecting stem, a gas-valve loosely connected to the said stem and receiving the thrust of the said stem to securely seat the gas-valve before the water-valve is seated and pipe admitting water and carbonic acid to the valve-case, substantially as described.

3. The herein-described carbonating apparatus, comprising a liquid-valve and a gas-valve, a liquid-supply between the valves, and a common valve-operating means for operating the liquid-valve to start the flow of liquid and to thereupon operate the gas-valve to bring gas to the liquid when the liquid flow has been started and to close the gas-valve before the closure of the liquid-valve.

In testimony whereof I have signed my name to this specification in the presence of two subscribing witnesses.

LOUIS RÜHL.

Witnesses:
   ERNST KAUFMANN,
   JACOB ADRIAN.